Figure 1:
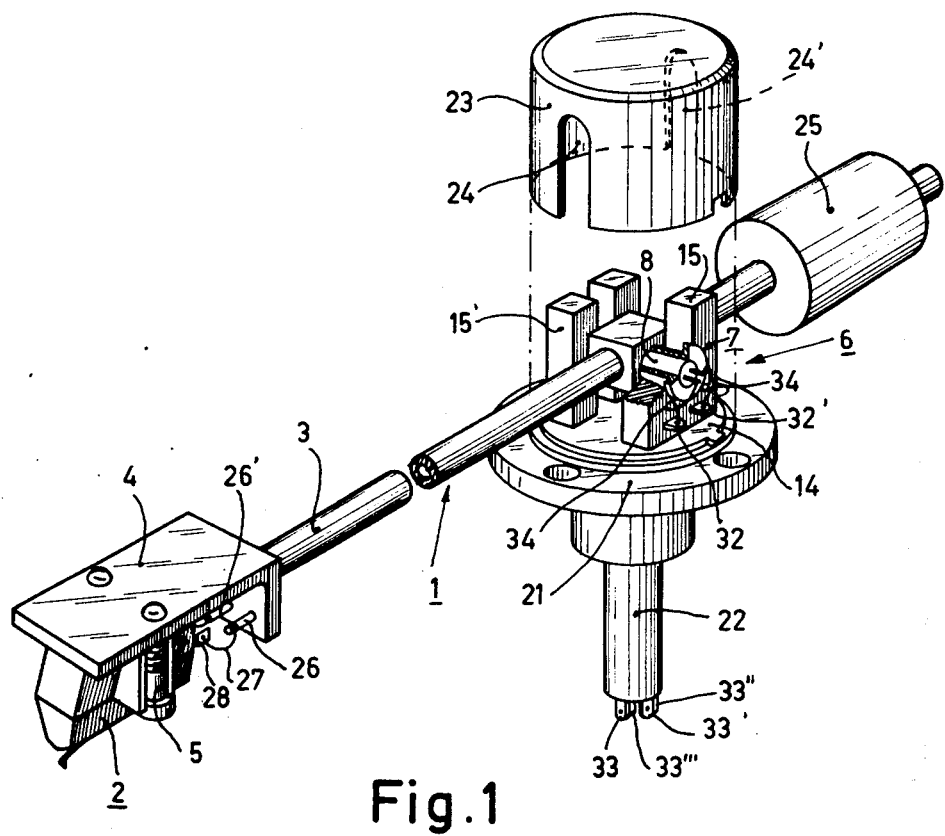

United States Patent [19]

Broeksema et al.

[11] 4,143,248
[45] Mar. 6, 1979

[54] HIGH FIDELITY PHONOGRAPH PICK-UP ARM

[75] Inventors: Egbert Broeksema; Elzo Smit, both of Eindhoven, Netherlands

[73] Assignee: U.S. Philips Corporation, New York, N.Y.

[21] Appl. No.: 726,174

[22] Filed: Sep. 24, 1976

[30] Foreign Application Priority Data

Sep. 29, 1975 [NL] Netherlands .................. 7511413

[51] Int. Cl.² ............................................. G11B 3/10
[52] U.S. Cl. ........................... 179/100.4 R; 274/23 R
[58] Field of Search ............. 179/100.4 R; 274/23 R, 274/23 A, 1 R

[56] References Cited

U.S. PATENT DOCUMENTS

| 2,476,848 | 7/1949 | Eckhardt et al. | 179/100.4 R |
| 3,556,537 | 1/1971 | Stacy | 274/23 R |
| 3,918,722 | 11/1975 | Nakajima et al. | 274/23 R |

FOREIGN PATENT DOCUMENTS 1339042  11/1973  United Kingdom .................. 274/23 R Primary Examiner—Raymond F. Cardillo, Jr.
Attorney, Agent, or Firm—David R. Treacy

[57] ABSTRACT

A phonograph pick-up arm having a shank which is at least partly made of a composite material consisting of high strength fibres embedded in a synthetic resin, a head for a connection and protection of a pick-up, a bearing connected to the shank for pivoting the arm in a bearing block, and electrical conductors embedded in the composite material for electrically connecting the pick-up to electrical connections on the bearing block. Preferably very thin solid conductors are equally spaced about the periphery of the composite material.

10 Claims, 5 Drawing Figures

HIGH FIDELITY PHONOGRAPH PICK-UP ARM

The invention relates to a pick-up arm suitable for an apparatus for mechanically scanning grooved rotary discs, such as phonograph records, with the aid of an electrical pick-up, and comprising a shank which is at least partly made of a composite material consisting of high strength thin fibres embedded in a matrix; a head at one end of the shank for mounting and protection of the pick-up and provided with electrical connection means for the pick-up; a bearing block near the shank end which is remote from the head and provided with bearing means; bearing means connected to the shank which co-operate with those of the bearing block; and electrical conductors extending from the head to the bearing block for transferring electrical signals from the pick-up to an electronic amplifier to be connected to the pick-up arm.

A pick-up arm manufactured from a composite material is known from German Offenlegungsschrift Nos. 2,432,974 and 2,435,191 to which U.S. Pat. Nos. 3,918,722 and 3,923,309 correspond. In comparison with the conventional pick-up arms, for example those which are provided with an aluminum shank, such pick-up arms have the advantage that the arms can be made substantially lighter at the same rigidity or even appreciably higher rigidity. Many composite materials, for example those which consist of graphite fibres embedded in a matrix of epoxy resin, have a ratio between the modulus of elasticity and density which is substantially greater than that of the usual materials. For example, in the case of aluminum of a quality which is suitable for pick-up arms the said ratio is $2.67 \times 10^8$ cm, whereas for a composite material consisting of 60% graphite fibres in an epoxy matrix this can be $11.8 \times 10^8$ cm. In addition, composite materials may exhibit very great strength, while they may also have other properties which are attractive for pick-up arms, such as a low coefficient of thermal expansion, good internal damping, and being non-magnetic. For further information with respect to the advantage of such pick-up arms, reference is made to the two aforementioned Offenlegungsschriften. Reference is also made to them for the manufacturing method. In this respect it is merely mentioned that for example the shank may be manufactured starting from flat thin plates or sheets, consisting of adjacently arranged carbon fibres which are joined to each other by means of an epoxy resin. From these sheets a sleeve shank can be formed, which is placed in a mold and heated therein at approximately 170° C. Heating causes the epoxy resin to melt, thus forming a matrix in which the carbon fibres are embedded. After removal from the mold and a second heat treatment a thin tube of a composite material is thus obtained.

In the pick-up arms known until now the electrical conductors which extend between the pick-up and the bearing block are formed by 3 or more copper wires provided with a plastic insulating sheath. The core thickness of these wires is typically 0.3 mm. In high-fidelity pick-up arms the wires are stranded in order to minimize cross-talk between the different audio channels and also for reasons of manufacturing technology. This is because during assembly the strand can be handled more simply than a number of separate wires.

A drawback of these known arms is that the electrical conductors have a comparatively high self-capacitance and furthermore the weight of the stranded wires is typically approximately 1 gram. For use in a pick-up arm of a composite material this would correspond to approximately one third of the weight of the actual arm, which may be of the order of 3 grams. A further drawback is that fitting the stranded wires into the shank of the pick-up arm is difficult.

It is an object of the invention to avoid the drawbacks outlined above especially with pick-up arms manufactured of a composite material of the type mentioned in the preamble. In a pick-up arm according to the invention the electrical conductors are embedded in the composite material of the pick-up arm.

Embedding electrical conductors in a pick-up arm is known per se, for example from British Pat. Specification No. 1,339,042. This concerns a pick-up arm for a toy phonograph which pick-up arm is integrally manufactured of a thermoplastic material, the vertical and horizontal movements of the pick-up arm being possible by the provision of locally thin portions in the pick-up arm material, which portions serve as integral hinges. In such a pick-up arm the electrical conductors must be capable of withstanding the movements at the location of the hinges. As a result of this, comparatively thick electrical wires must be used. However, if no hinges were formed in the thermoplastic material, the electrical conductors would still have to be comparatively thick in view of the high elasticity of the plastic used for the pick-up arm and the low dimensional stability thereof. Embedding the electrical conductors in a pick-up arm of composite material including high strength fibres has the special advantage that in view of the previously mentioned very high rigidity of the composite material very thin electrical conductors may be used. This provides great improvement in that the electrical conductors have only a small influence on the mass of the arm and the conductors have a low self-capacitance.

An embodiment of the invention is characterized in that each of the electrical conductors consists of a solid metal wire. In conventional pick-up arms such conductors cannot be used because theye are liable to break. Pick-up arms of a composite material, however, are so rigid that embedded wires in the form of solid metal wire with a metal cross-section of approximately 20 microns may be used. Such thin wires cannot be used in conventional pick-up arms.

In pick-up arms of the type mentioned in the preamble and in which the composite material contains electrically conductive fibres such as carbon fibres, in a preferred embodiment of the invention each of the conductors consists of a wire with a solid metal core having enamel insulation, such as are used on a large scale in electrical technology, for example in the manufacture of coils. In a pick-up arm in accordance with the invention they constitute for the first time a material which is suitable for wiring high-fidelity pick-up arms.

Preferably an embodiment is used which is characterized in that the electrical conductors are embedded at mutually equal distances. This step contributes to a low self-capacitance of the wires. An optimum result can be obtained with an embodiment in which the conductors are embedded at the outer surface of the composite material. This embodiment moreover has obvious advantages in respect of production technology, owing to the fact that the electrical conductors need not be fitted until at a final stage.

In a further preferred embodiment, to provide electrical shielding and also for esthetic improvement, the shank is provided with a thin protective metallic layer.

The shank may for example be surrounded by a thin metal foil which is glued on it. Another possibility is that the protective layer consists of a metal layer deposited on the composite material. At present many processes are known to those skilled in the art, in accordance with which metal layers can be deposited on plastic components with the aid of a suitable process, for example by immersion in a bath.

Pick-up arms in accordance with the invention may be of extremely light construction and therefore, also in view of their other previously mentioned favorable properties, they are eminently suitable for use in record players of very high quality, such as hi-fi record players and quadraphonic record players. Pick-ups may be used which bear on the record with a force smaller than 1 gram. It will be evident that with such pick-up arms the pick-up arm is readily susceptible to undesired torques. Such torques might for example be exerted on the arm at the location of the bearing block. The pick-up arm is pivoted to the bearing block, so as to allow the pick-up arm to perform vertical pivotal movements. Near the bearing block the electrical conductors must therefore be led out of the pick-up arm and connected to connecting means provided outside the pick-up arm. These connecting means should have a minimal influence on the pick-up arm movements and should exert minimal counteracting torques on said arm. Therefore, it is advantageous to employ an embodiment of the invention which is characterized in that the bearing means which are connected to the shank consist of bearing journals which are integral with the shank and which are also made of composite material, and that the conductors are embedded in at least a part of the bearing journals. Since the forces exerted on the conductors act at a very small radius, only small torques which counteract the pivotal arm movements are produced. Preferably, the bearing block is also made of composite material and provided with embedded electrical conductors. In particular in conjunction with the pick-up arms described hereinbefore this has the advantage that very small counteracting torques are exerted on the pivotal movements of the bearing block by the electrical conductors. As the bearing block is of a composite material it is again possible to use very thin conductors, which are moreover stationarily arranged in the material and can consequently transfer the electrical signals from the bearing arrangement to a location underneath a record player deck without exerting undesired torques on the bearing block.

In particular when very thin electrical conductors are used in yet another preferred embodiment the shank and/or the bearing block is provided with metal connecting terminals for electrically connecting the conductors to each other and also to the electronic amplifier, which terminals are embedded in the composite material, project partly therefrom and are more rigid mechanically than the electrical conductors. Said metal connecting elements may consist of soldering tags or pins or other suitable components.

Figure 2:
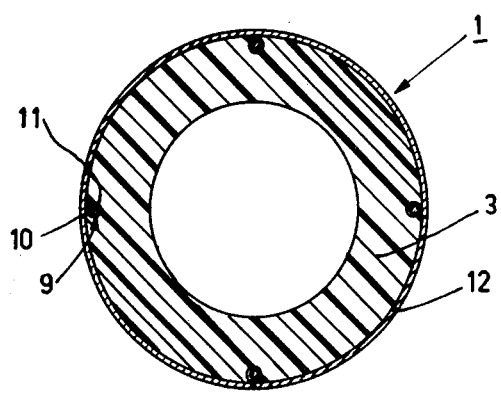
Figure 3:
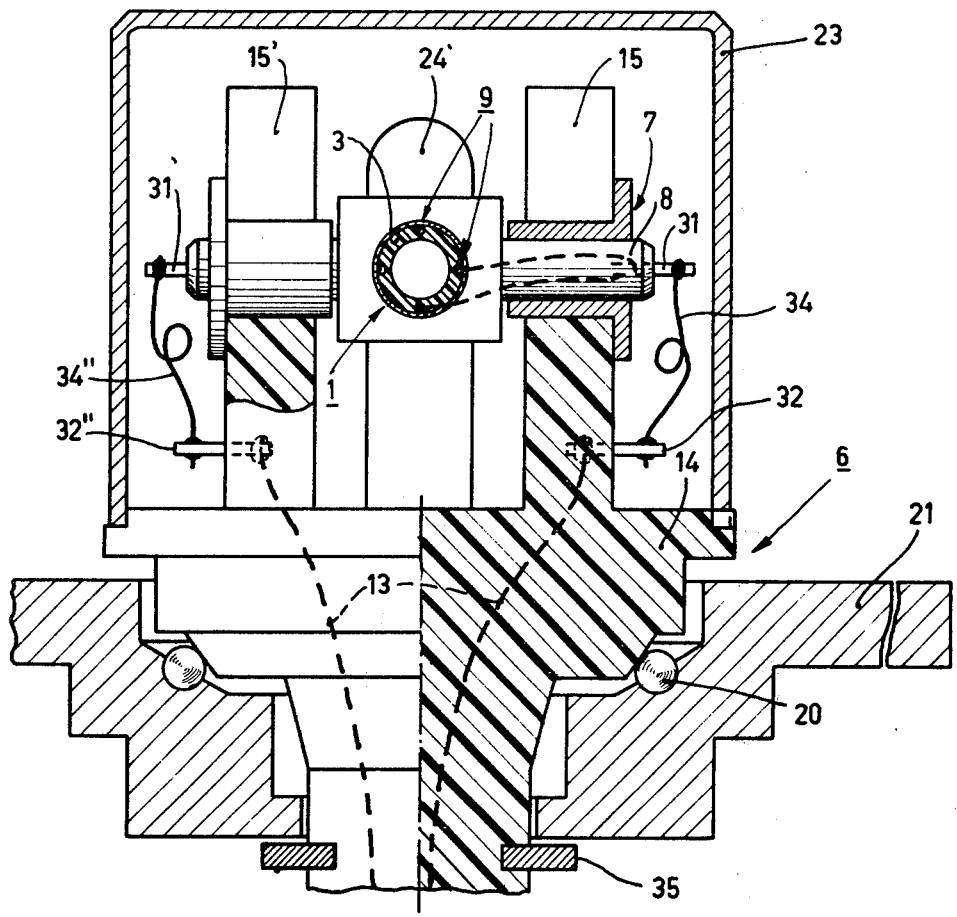
Figure 5:
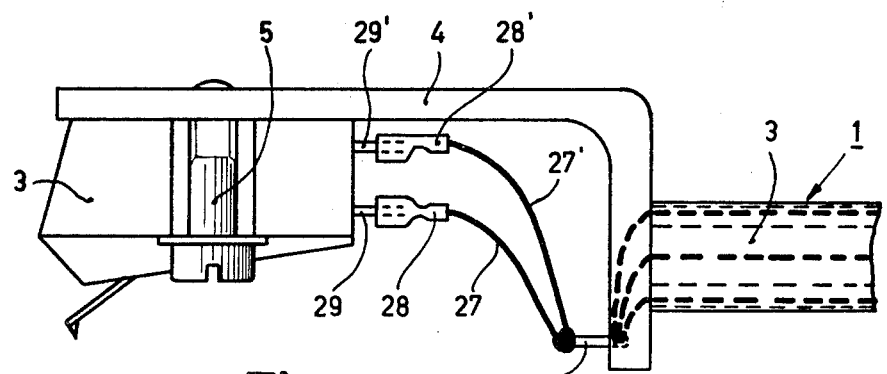
Figure 4:
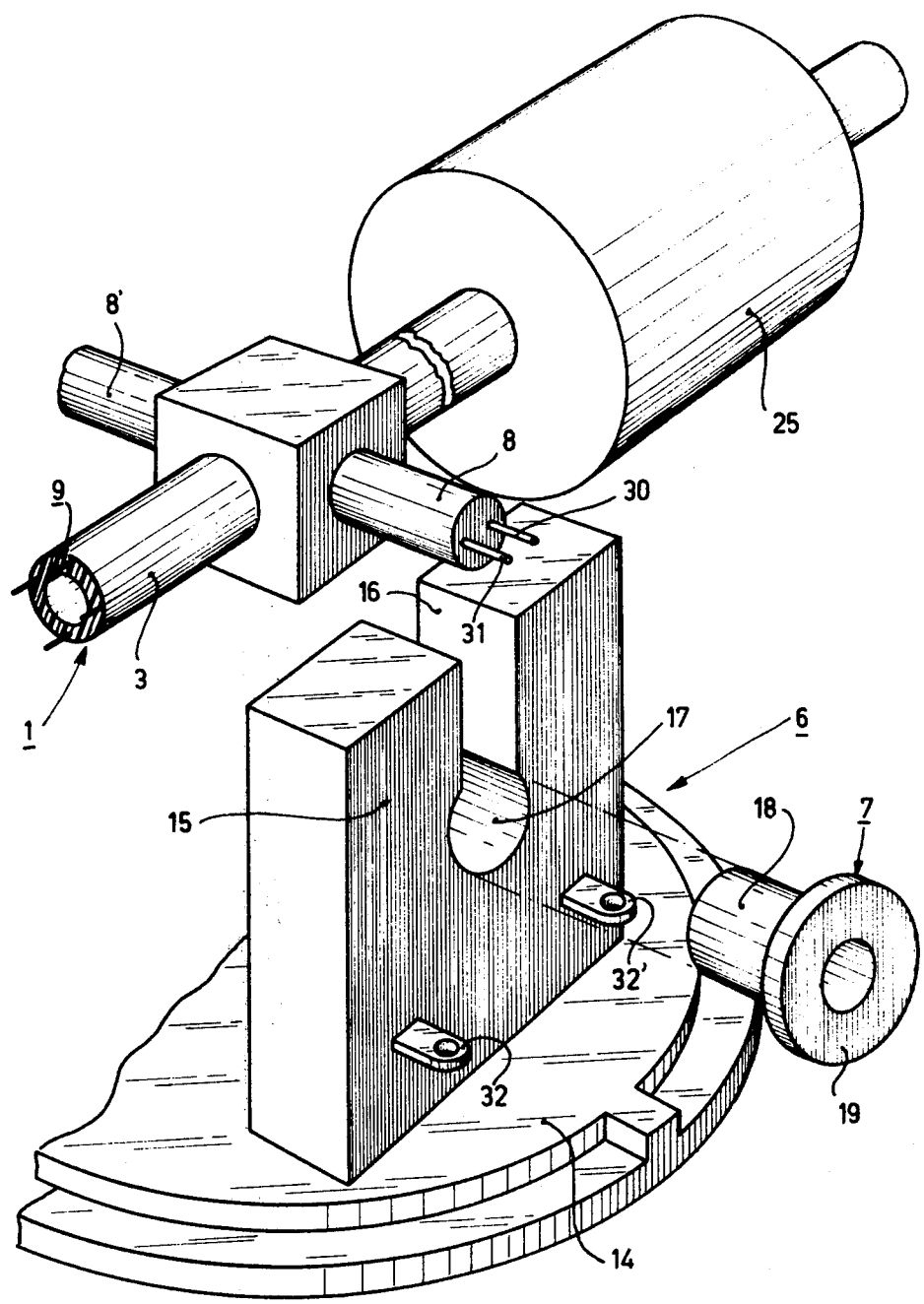

The invention will be described in more detail with reference to the drawing which schematically shows an embodiment and in which:

FIG. 1 is a perspective, partly exploded view of a pick-up arm in accordance with the invention, a part of a bearing support being shown broken away at the location of one of the bearings, FIG. 2 is a cross-section of the shank of the pick-up arm of FIG. 1, FIG. 3 is a cross-section at the location of the bearing block, FIG. 4 is a scaled-up exploded view, in perspective, at the location of one of the bearing supports of the pick-up arm of FIG. 1, and FIG. 5 is a scaled-up side view at the location of the pick-up arm of FIG. 1.

In FIG. 1 the pick-up arm bears the general reference numeral 1, and the pick-up mounted on it has the reference numeral 2. The pick-up arm comprises a shank 3 of a composite material and has connected thereto a head 4 for mounting and protection of a pick-up. In the head two threaded holes are formed which bear no reference numerals in the Figure and in which fixing bolts 5 are fitted for securing the pick-up to the head in known manner in accordance with the RETMA (Radio, Electronics and Television Manufacturers Association) standard. Near the shank end which is remote from the head a bearing block is located which bears the general reference numeral 6. The bearing block is provided with two bearing elements or bushings 7, only one of them being visible in FIG. 1 and FIG. 4. Said bearing bushings cooperate with bearing journals 8 and 8' which are connected to the shank. From the head four conductors 9 run towards the bearing block 6 for transferring the electrical signals from the pick-up 2 to an electronic amplifier, not shown, to be connected to the pick-up arm. The electrical wires are embedded in the composite material of the pick-up arm and comprise a solid copper wire 10, which is surrounded by an enamel insulating sheath 11. For this see in particular FIG. 2, which also clearly shows that the electrical conductors are embedded at the outer surface of the composite material at mutually equal distances. At its outer surface the shank 1 is provided with a thin metallic protective layer in the form of a metal foil 12 which is glued on it.

As previously stated, the bearing means which are connected to the shank 1 comprise two bearing journals 8 which are integrated with the shank and which consequently also consist of composite material. In each of the bearing journals 8 and 8' two of the four electrical conductors are embedded. The bearing block 6 is also made of composite material and is provided with electrical conductors 13 which correspond to the conductors 9 of the shank. The bearing block 6 comprises a flange-shaped portion 14 and two bearing supports 15 and 15' disposed at either side of the shank 1. In these bearing supports slots 16 and 16' are formed which are open at one end and which have a width which is slightly greater than the diameter of the corresponding bearing journals 8 and 8'. Opposite their open ends the slots terminate in openings 17 of greater diameter, see FIG. 4. The bearing elements or bushing 7 comprises a cylindrical portion 18 and a flange 19 at the end thereof. The diameter of the cylindrical portion 18 corresponds to the diameter of the opening 17. During assembly the bearing journals 8 are fitted in the openings 17 of the bearing supports 15 via the slots 16, after which the plain bearings 7 are fitted onto the bearing journals and are cemented in position in the bearing block with a small amount of glue. The bearing block 6 is pivotally mounted in a mounting flange 21 by a number of balls 20. A retaining ring 35 engages a portion 22 of the bearing block which extends further downwards to retain the block in the flange 21. This portion is located underneath the record player deck when the pick-up arm mounting flange 21 is mounted on a record player. In the fully assembled condition the bearing supports 15 are covered by means of a protective metal cap 23. Slots 24 and 24' are formed at two sides in this cap. The slot 24 serves for the passage of the part of the shank 1 which faces the head 4, and the slot 24' for the part of the shank 1 which faces the other side, around which part, as is common practice, a movable counterweight 25 is mounted for balancing the pick-up arm.

Both the shank and the bearing block are provided with metal connecting elements or electrical terminals which are rigid in comparison with the electrical conductors, which are embedded in the composite material and which partly project therefrom, for electrically connecting the conductors to each other and to the electronic amplifier to be connected. At the location of the head 4 in FIG. 4 only two such connecting elements or terminals are shown in the form of two soldering pins 26 and 26'. To each of these pins, four such pins being provided in total, one of the conductors 9 is connected, namely inside the material of the head 4, see in particular FIG. 5. The portions of these pins which project from the head 4 are connected to pins 29 and 29' of the pick-up 2 by means of wires, bearing the reference numerals 27 and 27' in FIG. 5, and with the aid of associated connectors 28 and 28'. Although FIG. 5 shows only two pins 29 and 29' of the pick-up, it is obvious that in reality four pins are provided, in accordance with the number of conductors in the arm 1. The journal 8 is provided with two soldering pins 30 and 31, the bearing support 15 with two soldering terminals or tags 32 and 32' and the cylindrical portion 22 of the bearing block with four soldering terminals or tags 33, 33', 33" and 33"". The soldering pins 30 and 31 as well as the corresponding soldering pins, not shown, in the journal 8', are connected to the electrical conductors 9, while the soldering tags 32 and 32' of the bearing support 15, as well as the corresponding soldering tags 33 and 33' are interconnected by means of electrical conductors 13. The connection from the soldering tags 32 and 32' to the soldering pins 30 and 31 are formed by very thin flexible wires 34 and 34'.

What is claimed is:

1. A high-fidelity phonograph pick-up arm comprising a shank formed from a composite material consisting essentially of high strength fibres embedded in a synthetic resin; a head connected to the shank at one end, the head including means for mechanically attaching and electrically connecting a phonograph pick-up; bearing means remote from said head end for mounting the pick-up arm in a bearing block, consisting of bearing journals formed with said shank as a unitary element, the composite material providing structural connection between the head and the bearing journals; a plurality of electrical conductors extending from the head to a bearing journal and connected at the head end to said means for electrically connecting; and means for making electrical connection to said conductors at the bearing block, wherein said electrical conductors are embedded in said composite material, and in at least a part of the bearing journals.

2. A pick-up arm as claimed in claim 1 wherein each electrical conductor is a solid metal wire having a cross-section of approximately 20 microns.

3. A pick-up arm as claimed in claim 1 wherein said electrical conductors are embedded at the outer surface of the composite material of which the shank is formed, at mutually equal distances.

4. A pick-up arm as claimed in claim 2 wherein said shielding layer is a deposited metal layer.

5. A pick-up arm as claimed in claim 2, wherein said shank includes a thin metallic shielding layer around and contacting the outer surface of the composite material.

6. A pick-up arm as claimed in claim 5 wherein said shielding layer is a thin metal foil glued onto the composite material.

7. A high-fidelity phonograph pick-up arm comprising a shank formed from a composite material consisting essentially of high strength fibres embedded in a synthetic resin; a head connected to the shank at one end, the head including means for mechanically attaching and electrically connecting a phonograph pick-up; a bearing block adapted for mounting the pick-up arm; bearing means remote from said head end for mounting the pick-up arm in the bearing block, said shank composite material providing structural connection between the head and the bearing means; pivotal means for mounting said bearing block on a phonograph deck; a plurality of electrical conductors extending from the head to the bearing block and connected at the head end to said means for electrically connecting; and means for making electrical connection to said conductors at the bearing block,
  wherein said electrical conductors are embedded in said composite material; and the bearing block includes a member made from a composite material consisting of high strength fibres embedded in a synthetic resin, said member having a portion extending downward from said pivot means, a bearing element for pivotally mounting said bearing means in the member, first electrical terminals projecting from said member adjacent said bearing element, second electrical terminals projecting from said member below said pivotal means for mounting, and electrical conductors embedded in said member electrically connecting respective ones of said first terminals to respective ones of said second terminals.

8. A high-fidelity phonograph pick-up arm comprising a shank formed from a composite material consisting essentially of high strength fibres embedded in a synthetic resin; a head connected to the shank at one end, the head including means for mechanically attaching and electrically connecting a phonograph pick-up; bearing means remote from said head end for mounting the pick-up arm in a bearing block, the composite material providing structural connection between the head and the bearing means; a plurality of electrical conductors extending from the head to the bearing block and connected at the head end to said means for electrically connecting; and means for making electrical connection to said conductors at the bearing block, wherein said electrical conductors are embedded in said composite material, and wherein said means for making electrical connection to a pick-up comprise metal connecting elements partially embedded in and projecting from said composite material, said connecting elements having greater mechanical rigidity than said electrical conductors.

9. A pick-up arm as claimed in claim 8 wherein said composite material comprises electrically conducting fibres and each conductor is a solid metal wire having enamel insulation thereabout.

10. A high-fidelity phonograph pick-up arm comprising a shank formed from a composite material consisting essentially of high strength fibres embedded in a synthetic resin; a head connected to the shank at one end, the head including means for mechanically attaching and electrically connecting a phonograph pick-up; bearing means including a bearing journal remote from said head end for mounting the pick-up arm in a bearing block, the composite material providing structural connection between the head and the bearing means; a plurality of electrical conductors extending from the head to the bearing block and connected at the head end to said means for electrically connecting; and means for making electrical connection to said conductors at the bearing block, wherein said electrical conductors are embedded in said composite material, and wherein said bearing block electrical connection means comprise metal connecting elements partially embedded in and extending from said bearing journal, having greater mechanical rigidity than said electrical conductors.

* * * * *